United States Patent
Mouly et al.

(10) Patent No.: US 11,674,592 B2
(45) Date of Patent: Jun. 13, 2023

(54) PLANET CARRIER FOR A SPEED REDUCER OF AN AIRCRAFT TURBOMACHINE

(71) Applicant: Safran Transmission Systems, Colombes (FR)

(72) Inventors: Guillaume Pierre Mouly, Moissy-Cramayel (FR); Jean-Pierre Serey, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/847,149

(22) Filed: Jun. 22, 2022

(65) Prior Publication Data
US 2022/0412453 A1 Dec. 29, 2022

(30) Foreign Application Priority Data
Jun. 24, 2021 (FR) .................................... 2106793

(51) Int. Cl.
  *F16H 57/08* (2006.01)
  *F02C 7/36* (2006.01)
  *F16H 1/28* (2006.01)

(52) U.S. Cl.
  CPC ............ *F16H 57/082* (2013.01); *F02C 7/36* (2013.01); *F05D 2260/40311* (2013.01); *F16H 1/28* (2013.01)

(58) Field of Classification Search
  CPC ................................ F16H 57/082; F02C 7/36
  See application file for complete search history.

(56) References Cited

U.S. PATENT DOCUMENTS 5,466,198 A * 11/1995 McKibbin ................. F02C 7/36
                                                          475/346
7,704,178 B2 * 4/2010 Sheridan ............. F16H 57/0423
                                                          475/159

(Continued)

FOREIGN PATENT DOCUMENTS

| DE | 102019127546 | 4/2021 |
| EP | 2773871 | 9/2014 |
| FR | 1379451 | 11/1964 |

OTHER PUBLICATIONS

FR2106793, French Novelty Search Report, dated Feb. 25, 2022, 10 pages.

*Primary Examiner* — Derek D Knight
(74) *Attorney, Agent, or Firm* — Kilpatrick Townsend & Stockton LLP

(57) ABSTRACT

A planet carrier (213) for a speed reducer (210) of a turbomachine (1), this planet carrier (213) having a main axis X and comprising:
  a cage carrier (222) comprising an annular row of axial fingers (282) about the axis X, which comprises first connection elements, and
  a cage (220) comprising at its periphery housings (280) and second connection elements which are mounted in said housings and which cooperate with the first connection elements to form connections between the cage carrier (222) and the cage (220), which allow at least one degree of freedom,
characterised in that the cage (220) comprises two shells (220a, 220b) which are axially assembled to each other, said first or second connection elements comprising broaches (288) oriented radially with respect to said axis X and passing through radial orifices (220a, 220a2, 220b1, 220b2) of said shells (220a, 220b).

13 Claims, 10 Drawing Sheets

(56) References Cited

U.S. PATENT DOCUMENTS 8,667,688 B2 * 3/2014 McCune ............... F02K 3/06
    475/159
9,267,389 B2 * 2/2016 Pescosolido ......... F16H 57/025

* cited by examiner

[Fig.1]
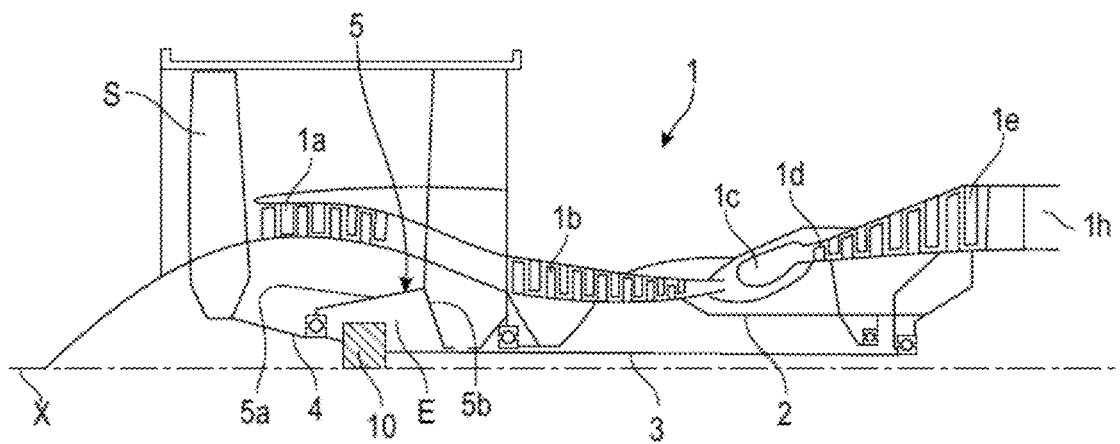

[Fig.2]
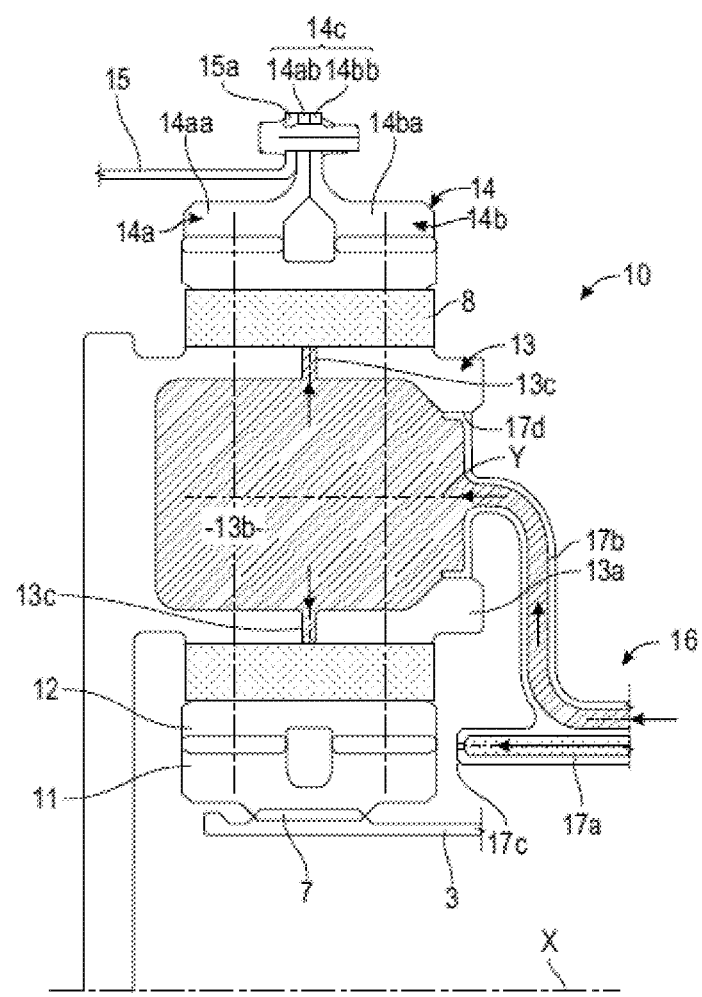

[Fig.3]
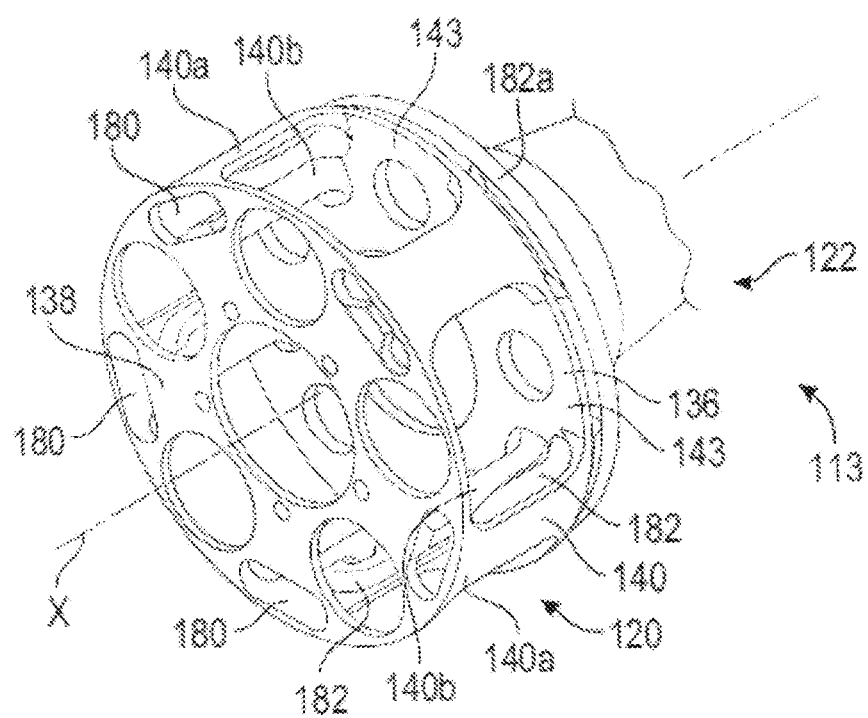
PRIOR ART

[Fig.4]
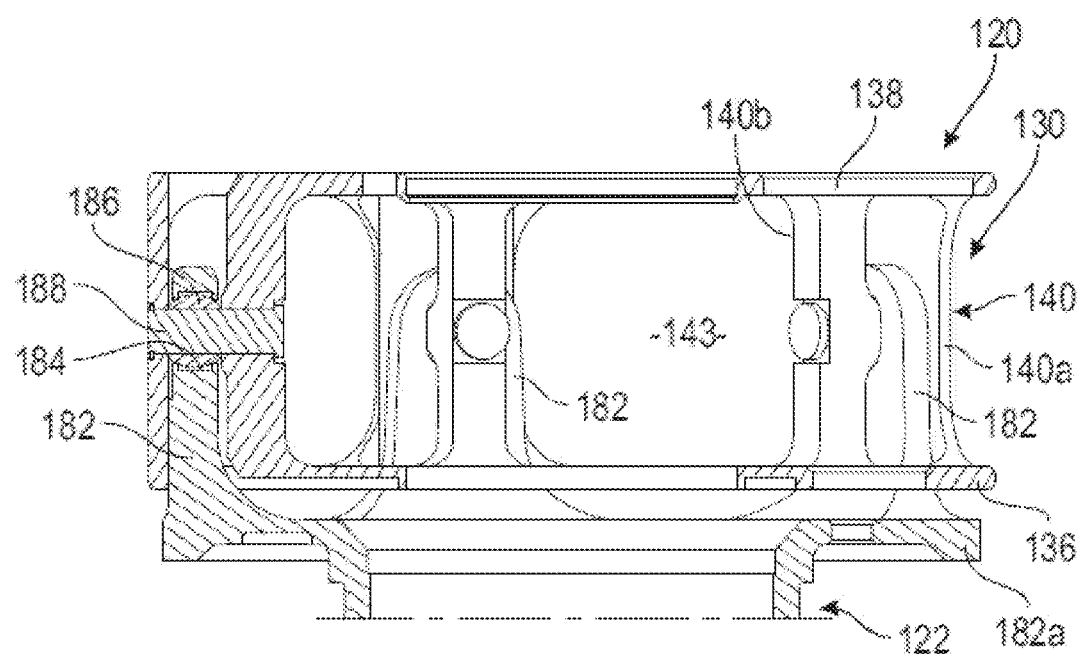
PRIOR ART

[Fig.5]
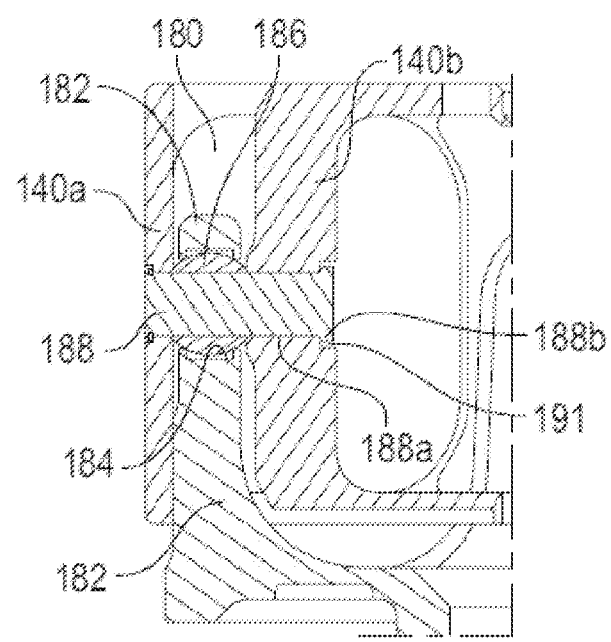
PRIOR ART

[Fig.6]
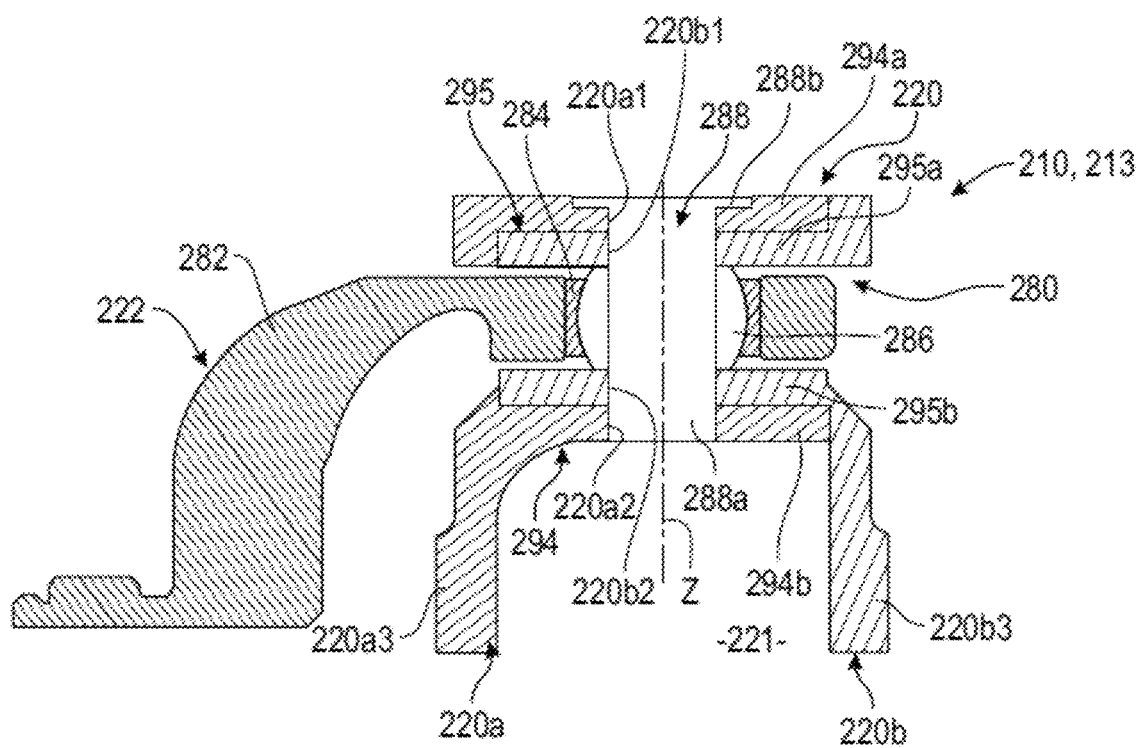

[Fig.7a-7d]
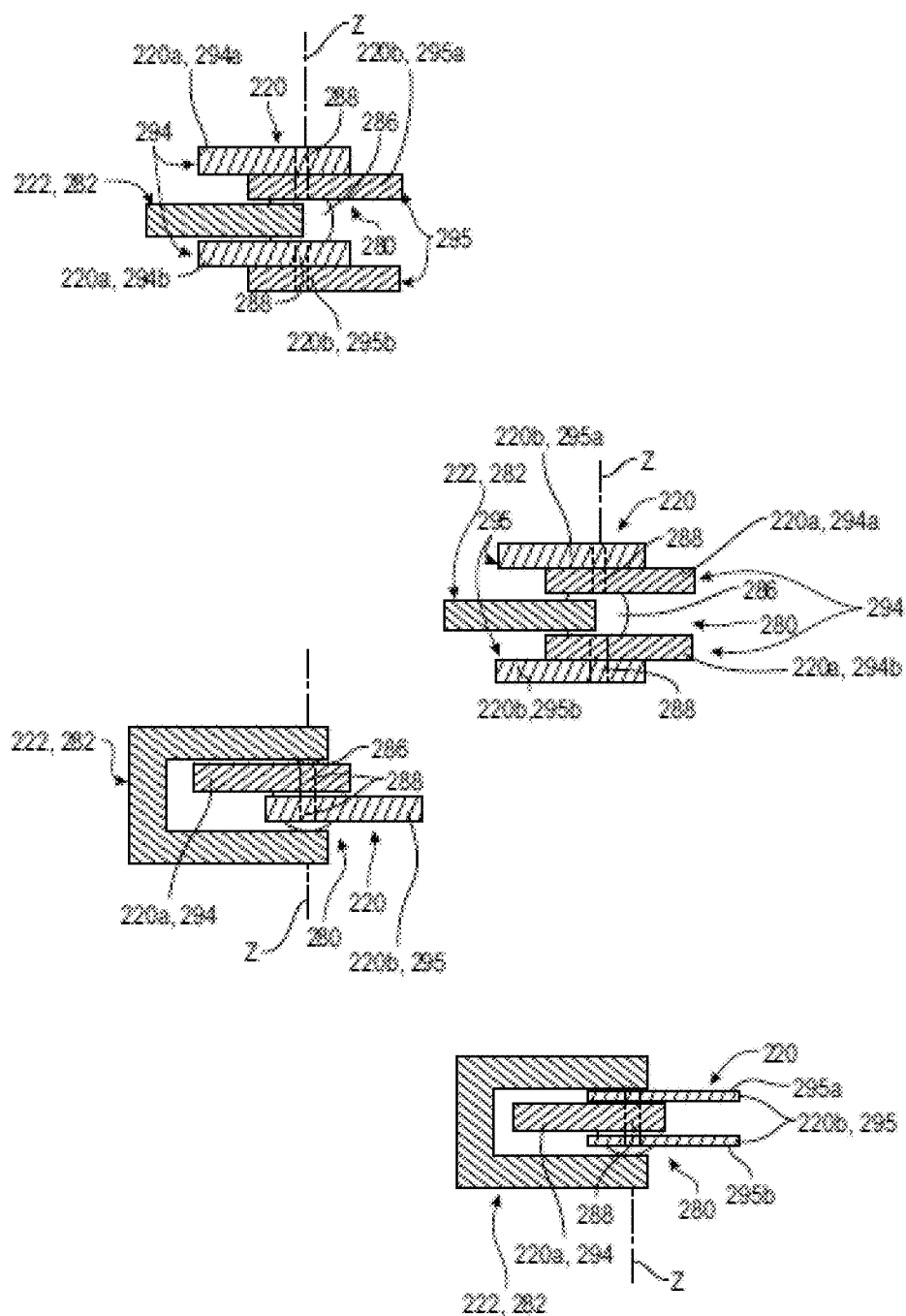

[Fig.8]
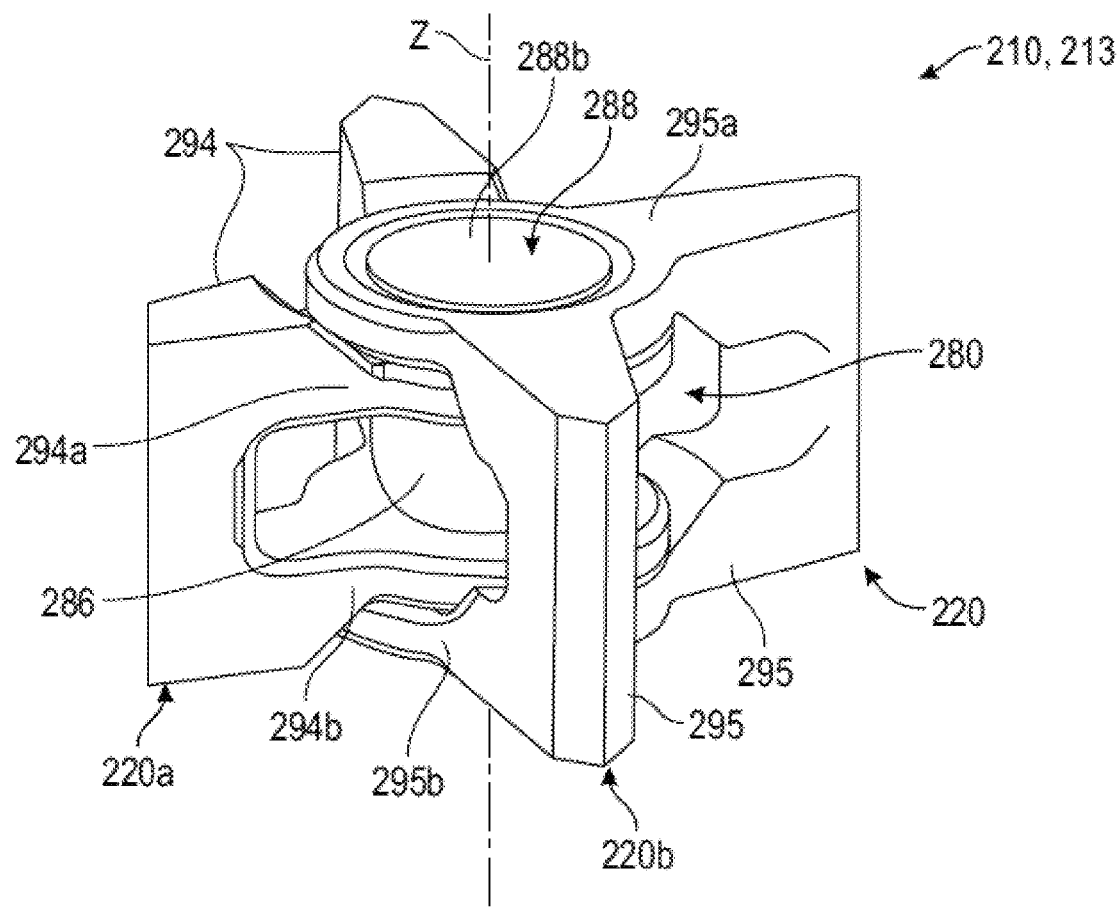

[Fig.9]
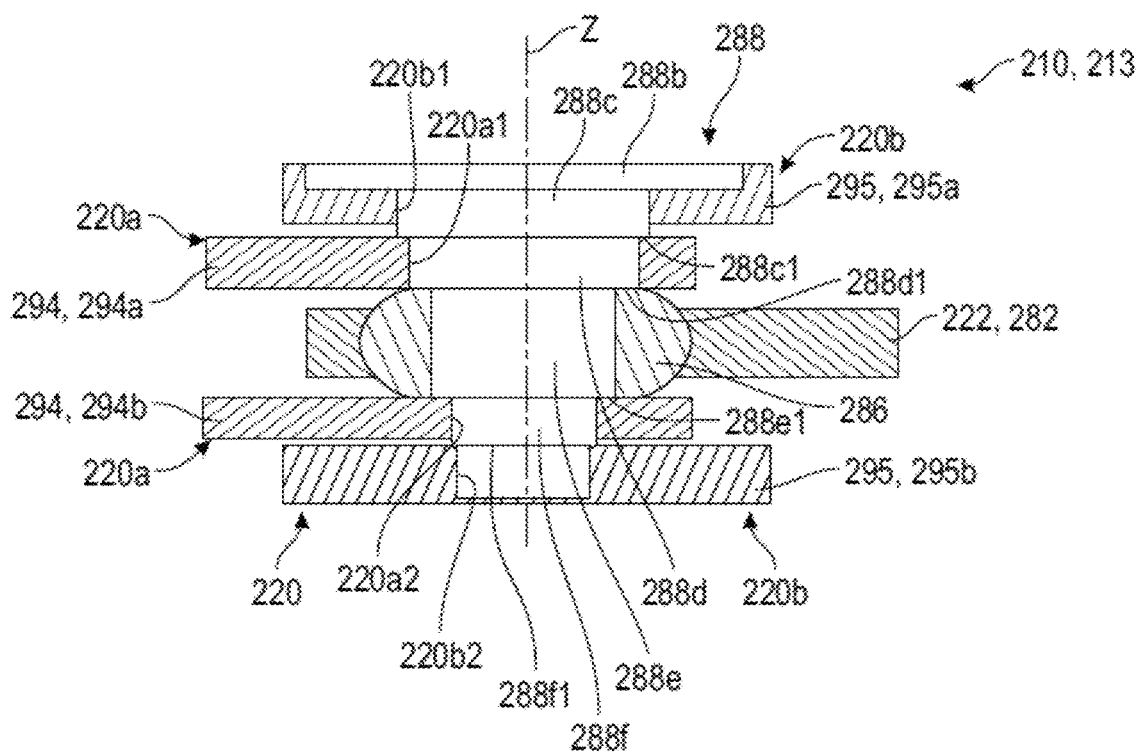

[Fig.10a-10d]
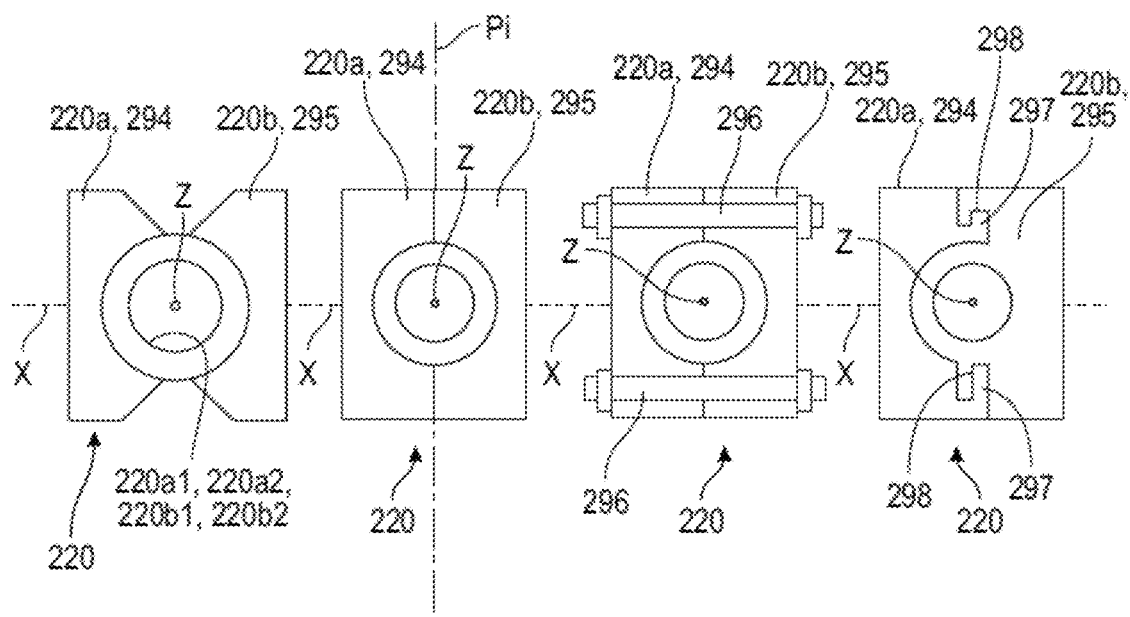

PLANET CARRIER FOR A SPEED REDUCER OF AN AIRCRAFT TURBOMACHINE

TECHNICAL FIELD OF THE INVENTION

The present invention relates to a planet carrier for a speed reducer of an aircraft turbomachine, as well as a speed reducer for an aircraft turbomachine.

TECHNICAL BACKGROUND

The prior art comprises in particular the documents FR-A1-2 987 416, FR-A1-2 853 382, FR-A1-3 041 054, FR-A1-3 052 213, FR-A1-3 073 915, FR-A1-3 084 428, and U.S. Pat. No. 5,466,198-A.

The role of a mechanical reducer is to modify the gear ratio and the torque between the input axle and the output axle of a mechanism.

The new generations of double-flow turbomachines, in particular those with a high bypass ratio, comprise a mechanical reducer to drive the shaft of a fan. The usual purpose of the reducer is to convert the rotational speed referred to as high speed of the shaft of a power turbine into a slower rotational speed for the shaft driving the fan.

Such a reducer comprises a central sprocket, referred to as sun gear, a ring gear and sprockets referred to as planet gears, which are engaged between the sun gear and the ring gear. The planet gears are maintained by a chassis referred to as planet carrier. The sun gear, the ring gear and the planet carrier are planetary because their axes of revolution coincide with the longitudinal axis of the turbomachine. The planet gears each have a different axis of revolution and are equally distributed on the same operating diameter around the axis of the planetaries. These axes are parallel to the longitudinal axis of the turbomachine.

There are several reducer architectures. In the prior art of the double-flow turbomachines, the reducers are of the planetary or epicyclic type. In other similar applications, there are architectures referred to as differential or "compound".

- on a planetary reducer, the planet carrier is stationary and the ring gear is the output shaft of the device which rotates in the opposite direction of the sun gear.
- in an epicyclic reducer, the ring gear is stationary and the planet carrier is the output shaft of the device which rotates in the same direction as the sun gear.
- on a compound reducer, no element is attached in rotation. The ring gear rotates in the opposite direction of the sun gear and of the planet carrier.

The reducers can consist of one or more meshing stages. This meshing is ensured in different ways such as by contact, friction or by magnetic field. There are several types of meshing by contact such as straight or herringbone toothings.

The planet carrier may be a one-piece or may be in the form of a cage and a cage carrier. The cage comprises an internal cavity in which the sun gear, the planet gears and the guide bearings of these planet gears are housed. The sun gear comprises internal splines for coupling to a first shaft of the turbomachine and the cage carrier comprises a cylindrical segment comprising external splines for coupling to another shaft.

The connection of the cage to the cage carrier is usually rigid. Alternatively, a technology can be envisaged in which the cage is connected to the cage carrier by "flexible" connections, as described in the document FR-A1-2 853 382. In such a case, the cage carrier comprises an annular row of axial fingers that carry first connection elements. These first connection elements cooperate with second connection elements mounted in housings of the cage to form the flexible connections between the cage carrier and the cage, which allow at least one degree of freedom.

It has been proposed that these flexible connections be made by ball joints, with the fingers carrying ball joints through which cylindrical broaches pass extending into the housings of the cage.

During operation, when the planet carrier is torqued, the fingers will flex and transmit the torque to the cage. The ball joints allow to ensure that the flexing of the fingers is not transmitted to the broaches. The cage carrier maintains the cage in its plane of symmetry to balance the recovery of forces on both sides of the planet gears.

The mounting of the planet gears in the cage is sometimes not feasible either from the inside or from the outside of the cage, imposing then to cut the cage in several parts in order to mount the planet gears before closing the assembly of the parts of the cage.

A solution to this problem could be consisting of separating one of the sides of the cage from the rest of the cage and providing annular attachment flanges on the side and the rest of the cage respectively. However, these flanges and the attachment means (screws) of these screws would have to be sized to support at least 50% of the load of the reducer, which would result in bulky and heavy flanges and means of attachment for these flanges that are very constrained during operation.

The present invention proposes an improvement that provides a simple, effective and economical solution to at least some of the above problems.

SUMMARY OF THE INVENTION

The invention relates to a planet carrier for a speed reducer of a turbomachine, this planet carrier having a main axis X and comprising:
- a cage carrier comprising an annular row of axial fingers about the axis X, which comprises first connection elements, and
- a cage comprising an internal cavity configured to contain a central sun gear of axis X of rotation and an annular row of planet gears arranged around the axis X and meshed with said sun gear and with a ring gear intended to surround the cage, the cage comprising at its periphery housings and second connection elements which are mounted in said housings and which cooperate with the first connection elements to form connections between the cage carrier and the cage, said connections having at least one degree of freedom, the cage comprising two shells which are axially assembled to each other, said first or second connection elements comprising broaches oriented radially with respect to said axis X and passing through radial orifices of said shells, characterised in that each of the shells comprises one or two orifices for mounting each of the broaches.

The present invention thus proposes the use of broaches for the connection elements of the cage or of the cage carrier, these broaches being radially oriented and mounted in radial orifices in the two shells of the cage. Contrary to the solution mentioned above, which consists of separating one of the sides of the cage from the rest of the cage and in which the broaches would be carried solely by the rest of the cage, the broaches are carried here by the shells of the cage, which allows each of these shells to take up a portion of the forces that pass between the cage and the cage carrier during operation.

The present invention is compatible with
a single or multi-stage reducer;
a planetary, epicyclic or compound reducer; and
of straight, helical or herringbone toothings.

The planet carrier according to the invention may comprise one or more of the following characteristics, taken alone from each other, or in combination with each other:
each of the shells defines an axial portion of said cavity and is intended to receive an axial portion of each of the planet gears;
said second elements comprise said broaches and ball joints through which said broaches pass, and said first elements comprise rings in which said ball joints are housed;
said first elements comprise said broaches and ball joints through which said broaches pass, and said second elements comprise rings in which said ball joints are housed;
said orifices are formed in tabs of said shells, the tabs of each shell being evenly distributed about the axis X and being at least partly superimposed in radial direction with the tabs of the other shell;
each of the tabs of a first of the shells comprises two parallel first walls which respectively comprise two aligned radial orifices for mounting one of the broaches, and/or each of the tabs of a second of the shells comprises two parallel second walls which respectively comprise two aligned radial orifices for mounting this same broach;
the first walls are located between the second walls, or one of the first walls is interposed between the two second walls;
said fingers are interposed between the first walls and between the second walls;
said fingers are each generally C-shaped and comprise two parallel branches between which are interposed said first and second walls; and
the shells are supported axially one against the other, and/or are axially attached to each other, and/or are axially and/or circumferentially nested within each other.

The present invention also relates to a mechanical reducer for an aircraft turbomachine, comprising a planet carrier as described above, a sun gear mounted in said cavity and centred on said axis X, a ring gear extending around the sun gear, and planet gears mounted in said cavity and meshed with the sun gear and the ring gear.

The invention further relates to a turbomachine, in particular for an aircraft, comprising a reducer as described above.

BRIEF DESCRIPTION OF THE FIGURES

Further characteristics and advantages will be apparent from the following description of a non-limiting embodiment of the invention with reference to the appended drawings in which:

FIG. 1 is a schematic axial cross-sectional view of a turbomachine using the invention;

FIG. 2 is a schematic view of a reducer with epicyclic gear train in axial cross-section;

FIG. 3 is a perspective view of a cage and cage carrier assembly forming a reducer planet carrier;

FIG. 4 is a partial axial cross-sectional view of a portion of the planet carrier of FIG. 3;

FIG. 5 is a detail view of FIG. 4;

FIG. 6 is a partial schematic view in axial cross-section of a reducer planet carrier according to the invention, and shows a connection between the cage and the cage carrier of this planet carrier;

FIGS. 7a-7d illustrate in a very schematic way several variants of embodiments of the connection of FIG. 6;

FIG. 8 is a schematic perspective view of a connection element of the two shells of a cage for a planet carrier according to the invention;

FIG. 9 is a schematic cross-sectional view of a connection between a cage carrier and the cage of FIG. 8; and FIGS. 10a-10d illustrate in a very schematic way several variants of embodiments of the connection elements of the shells of the cage, FIG. 10a corresponding to the view of FIG. 8.

DETAILED DESCRIPTION OF THE INVENTION

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is connected to the LP shaft 3 by means of a reducer 10. This reducer is usually of the planetary or epicyclic type.

Although the following description concerns a reducer with planetary or epicyclic type, it also applies to a mechanical differential in which its three essential components, that are the planet carrier, the ring gear and the sun gear, can be rotatable, the rotational speed of one of these components depending in particular on the difference in speed of the other two components.

The reducer 10 is positioned in the upstream portion of the turbomachine. A stationary structure comprising schematically, here, an upstream portion 5a and a downstream portion 5b which makes up the engine casing or stator 5 is arranged so as to form an enclosure E surrounding the reducer 10. This enclosure E is here closed upstream by seals at the level of a bearing allowing the passage of the fan shaft 4, and downstream by seals at the level of the passage of the LP shaft 3.

FIG. 1 shows a portion of a reducer 10 that can take the form of different architectures depending on whether certain parts are stationary or in rotation. The input of the reducer 10 is connected to the LP shaft 3, for example by means of splines 7. Thus the LP shaft 3 drives a planetary sprocket referred to as the sun gear 11. Classically, the sun gear 11, whose axis of rotation is coincident with the axis X of the turbomachine 1, drives a series of sprockets referred to as planet gears 12, which are equally spaced on the same diameter around the axis of rotation X. This diameter is equal to twice the operating centre distance between sun gear 11 and planet gears 12. The number of planet gears 12 is generally defined between three and seven for this type of application.

The assembly of the planet gears 12 is maintained by a chassis referred to as planet carrier 12. Each planet gear 12 rotates around its own axis Y, and meshes with the ring gear 14.

At the output of the reducer 10, we have:
- in an epicyclic configuration, the assembly of the planet gears 12 drives the planet carrier 13 in rotation around the axis X of the turbomachine. The ring gear 14 is attached to the engine casing or stator 5 via a ring gear carrier 15 and the planet carrier 12 is attached to the fan shaft 4.
- in a planetary configuration, the assembly of the planet gears 12 is maintained by a planet carrier 12 which is attached to the engine casing or stator 5. Each planet gear drives the ring gear which is fitted to the fan shaft 4 via a ring gear carrier 15.

Each planet gear 12 is mounted freely in rotation by means of a bearing 8, for example of the rolling or hydrostatic bearing type. Each bearing 8 is mounted on one of the axles 13a of the planet carrier 12, and all of the axles are positioned relative to each other using one or more structural chassis of the planet carrier 12. There is a number of axles and bearings equal to the number of planet gears. For reasons of operation, mounting, production, inspection, repair or replacement, the axles 13a and the chassis can be separated into several parts.

For the same reasons mentioned above, the toothing of a reducer can be separated into several helixes. In our example we detail the operation of a reducer 10 with several helixes with a ring gear separated into two half-ring gears:
- a front half-ring gear 14a comprising a rim 14aa and an attachment half-flange 14ab. On the rim 14aa is the front helix of the toothing of the reducer. This front helix meshes with that of the planet gear 12 which meshes with that of the sun gear 11.
- a rear half-ring gear 14b comprises a rim 14ba and an attachment half-flange 14bb. On the rim 14ba is the rear helix of the toothing of the reducer. This rear helix meshes with that of the planet gear 12 which meshes with that of the sun gear 11.

The attachment half-flange 14ab of the front ring gear 14a and the attachment half-flange 14bb of the rear ring gear form the attachment flange 14c of the ring gear. The ring gear 14 is attached to the ring gear carrier 15 by assembling the attachment flange 14c of the ring gear and the attachment flange 15a of the ring gear carrier using a bolted mounting, for example. In the following, a half-flange may be referred to as a flange.

The arrows in FIG. 1 describe the oil conveying in the reducer 10. The oil arrives in the reducer 10 from the stator portion 5 in the dispenser 16 by different means which will not be specified in this view because they are specific to one or several types of architecture. The dispenser 16 is separated into two portions, each of which is repeated by the same number of planet gears. The function of the injectors 17a is to lubricate the toothings, and the function of the arms 17b is to lubricate the bearings 8. The oil is fed towards the injector 17a to emerge through the end 17c to lubricate the toothings. The oil is also fed towards each arm 17b and circulates through the feed opening 17d of the bearing 8. The oil then circulates through the shaft 13a into one or more buffer areas 13b and then emerges through orifices 13c to lubricate the bearings 8 of the planet gears.

In FIGS. 3 to 5, the elements already described above are designated by the same references increased by one hundred.

FIGS. 3 through 5 depict a particular technology of planet carrier 113, this planet carrier comprising a cage 120 and a cage carrier 122 connected by ball joint connections. The cage 120 comprises two radial annular walls 136, 138 that are parallel to each other and perpendicular to the axis X, and a cylindrical wall 140 that extends between the external peripheries of these walls 136, 138.

The cylindrical wall 140 is here of the double-skinned type and comprises an external skin 140a interrupted by slots 143 and an internal skin 140b interrupted by the same slots 143. The external skin 140a separated by five slots 143 forms five outer bridges and the internal skin 140b separated by five slots 143 forms five inner bridges. Each pair of lower and upper bridges form a clevis to accommodate the finger 182 of the cage carrier 122. In other words, the bridges of each pair define between them a housing 180 for receiving a finger 182 of the cage carrier 122. The bridges ensure the structural connection between the walls 136 and 138. Elongated slots 180 are formed in at least one of the walls 136 and 138 so as to allow the finger 182 to pass between the inner and outer bridges.

The cage 120 thus comprises an annular row of housings 180. These housings 180 receive the axial fingers 182 integral with a substantially radial annular wall 182a of the cage carrier 122. The wall 182a is located at an axial end of the cage carrier 122. The fingers 182 extend axially from the wall 182a and are engaged by axial translation into the housings 180.

Each finger 182 comprises, substantially in its middle, a mounting ring 184 of the ball joint 186 intended to be passed through by a cylindrical broach 188 carried by the cage 120.

The ring 184 has a substantially radial orientation with respect to the axis X. It has a generally cylindrical shape. The cage 120 and the ball joint 186 have a thickness, measured in a radial direction with respect to the axis X, which is less than the inter-bridges distance or the radial thickness of the oblong slot 180, so that they can be engaged in this housing concomitantly with the finger 182 supporting these parts.

Each housing 180 is passed through by a broach 188 which has a substantially radial orientation with respect to the axis X. Each broach 188 comprises a cylindrical body 188a connected at an axial end, here radially internal, to an external annular collar 188b. The broach 188 is here engaged by radial translation from the inside through the radial orifices of the bridges, its collar 188b being intended to come to be radially supported on a flat face 191 of the outer bridge of the cage 120. After insertion of the broach 188 into the orifices of the bridges, until the collar 188b is in contact with the outer bridge, the collar 188b is attached to this bridge, for example by screwing.

As shown in FIGS. 3 to 5, the cage 120 is formed in one single part and the broaches 188 forming the connection elements carried by the cage extend in a radial direction and are mounted from the radial orifices of the bridges of this cage 120.

The invention proposes an improvement to this technology in which the cage of the planet carrier is instead made in two portions, namely two shells, and in which the broaches of the connection elements carried by the cage or the cage carrier pass through radial orifices in these two shells.

FIG. 6 represents a first embodiment of the invention.

FIG. 6 partially shows the cage 220 and the cage carrier 222 of the planet carrier 213 of the reducer 210.

The cage carrier 222 is similar to that described in the foregoing with reference to FIGS. 3 to 5.

Generally speaking, the number of fingers 282 on the cage carrier 222 may be the same as the number of planet gears 12 on the reducer 210 and is, for example, three in the example shown. The fingers 282 are evenly distributed around the main axis X of the reducer 210 and of the planet carrier 213.

In the embodiment shown in FIG. 6, each finger 282 comprises a radial orifice in which a ring 284 is mounted and can be shrunk into this orifice.

The ring 284 surrounds a ball joint 286 which comprises a radially oriented internal bore and passed through by a broach 288 mounted in one of the housings 280 of the cage. The fingers 282 are therefore engaged in the housings 280. The common radial axis of the broach 288, the bore of the ball joint 286, and the ring 284 is denoted Z.

Each broach 288 comprises a cylindrical body 288a connected at an axial end, located here radially outward (top in the drawing), to an external annular collar 288b. The broach 288 is here engaged by radial translation from the outside through radial orifices 220a1, 220a2, 220b1, 220b2 of the shells 220a, 220b of the cage 220, and its collar 288b is intended to come to be radially supported on a face of one of these shells 220a.

The end of the broach 288 opposite the collar 288b is shrink-fitted or comprises a screw thread of a nut.

The cage 220 comprises an internal cavity 221 configured to contain the sun gear 11 and the planet gears 12 arranged around the sun gear 11 and meshed with the sun gear 11 as well as with the ring gear 14 intended to surround the cage 220 (see FIG. 2).

One axial portion or half of the cavity 221 may be defined by one of the shells 220a and the other axial portion or half of the cavity 221 may be defined by the other shell 220b.

The bridges of the cage 220 mentioned above in relation to FIGS. 3 to 5 are here formed by portions of the two shells 220a, 220b.

FIG. 6 as well as the variants illustrated in the following figures show one of these bridges and thus the portions of the shells 220a, 220b which allow to form this bridge and which carry connection elements to the connection elements of the cage carrier 222.

Although the following description relates to one bridge and the connection elements at the level of that bridge, it applies to all the bridges of the cage 220.

In the case of FIG. 6, the connection elements of the cage 220 are formed by a broach 288 and a ball joint 286 passed through by this broach 288. The broach 288 passes through two radial orifices 220a1, 220a2 of the shell 220a and two radial orifices 220b1, 220b2 of the shell 220b, these orifices 220a1, 220a2, 220b1, 220b2 being aligned along the axis Z.

The orifices 220a1, 220a2, 220b1, 220b2 are formed in tabs 294 of the shells 220a, 220b. Once assembled, the tabs 294 of the shells 220a, 220b are intended to form the bridge. The tabs 294 of each shell 220a, 220b are thus evenly distributed around the axis X.

The shell 220a, located on the left in FIG. 6, comprises first tabs 294, only one of which is visible. This tab 294 extends in an axial direction from a radial wall 220a3 of the shell 220a and comprises two walls 294a, 294b, upper and lower respectively. These walls 294a, 294b are parallel and extend in planes perpendicular to the axis Z. These walls 294a, 294b comprise the orifices 220a1, 220a2 that are aligned along the axis Z. These walls 294a, 294b further form a female segment.

The shell 220b, located on the right in FIG. 6, comprises second tabs 295, only one of which is visible. This tab 295 extends in an axial direction from a radial wall 220b3 of the shell and comprises two walls 295a, 295b, upper and lower respectively. These walls 295a, 295b are parallel and extend in planes perpendicular to the axis Z. These walls 295a, 295b comprise the orifices 220b1, 220b2 that are aligned along the axis Z. These walls 295a, 295b further form a male segment that is intended to cooperate by male/female engagement with the walls 294a, 294b of the shell 220a, as shown in the drawing.

To do this, the shells 220a, 220b are axially aligned along the axis X and the tabs 294, 295 are also axially aligned with each other. The shells 220a, 220b are moved toward each other until the walls 295a, 295b of the shell 220b engage between the walls 294a, 294b of the shell 220b.

As seen in FIG. 6, the housing 280 is formed substantially between the walls 295a, 295b of the shell 220b, which form the male segment.

The ball joint 286 is inserted into the housing 280 and between the walls 295a, 295b of the shell 220b. It is preferably mounted without clearance in radial direction, i.e. along the axis Z.

The broach 288 passes through the ball joint 286 as discussed above, and the finger 282 is mounted in the housing 280 with radial clearances to allow angular deflections of the finger 282 relative to the broach 288 during operation.

FIG. 7a to 7d show alternative embodiments for the connections between the cage carrier 222 and the cage 220 of the planet carrier 213.

In the alternative embodiment shown in FIG. 7a, top left, the cage carrier 222 and its fingers 282 are similar to those in FIG. 6.

The shell 220a comprises first tabs 294 of which only one is visible. This tab 294 extends in axial direction from a radial wall (not visible) of the shell and comprises two walls, respectively upper 294a and lower 294b. These walls 294a, 294b are parallel and extend in planes perpendicular to the axis Z. These walls 294a, 294b comprise the orifices that are aligned along the axis Z.

The shell 220b comprises second tabs 295 of which only one is visible. This tab 295 extends in axial direction from a radial wall (not visible) of the shell and comprises two walls, respectively upper 295a and lower 295b. These walls 295a, 295b are parallel and extend in planes perpendicular to the axis Z. These walls 295a, 295b comprise the orifices that are aligned along the axis Z.

The walls of the shells 220a, 220b are nested such that the wall of the shell 220b is radially interposed between the wall of the shell and the finger 282, and the wall of the shell 220a is radially interposed between the wall of the shell and the finger 282.

The mounting of the shells 220a, 220b can take place as shown above with reference to FIG. 6, until the tabs 294, 295 axially nested within each other.

The alternative embodiment in FIG. 7b, top right, corresponds to the embodiment in FIG. 6 with the only difference that it is the tabs 294 of the shell 220a that form male segments, and it is the tabs 295 of the shell 220b that form female segments.

In the alternative embodiments shown in FIGS. 7c, bottom left, and 7d, bottom right, each of the fingers 282 of the cage carrier 222 is generally C-shaped and comprises two parallel branches. These branches extend in planes perpendicular to the axis Z. They define between them a space for housing the tabs 294, 295 and their walls.

In the case of FIG. 7c, each tab 294 of the shell 220a comprises a single wall that is perpendicular to the axis Z and comprises a radial orifice for the mounting of the broach 288. Each tab 295 of the shell 220b comprises a single wall that is perpendicular to the axis Z and comprises a radial orifice for the mounting of the broach 288. The wall of the shell 220a is radially interposed between the upper or external branch of the finger 282 and the wall of the shell 220b, and the wall of this shell 220b is radially interposed between the wall of the shell 220a and the lower or internal branch of the finger.

In the case of FIG. 7c, the broach 288 is carried by the finger 282 and not the shells 220a, 220b. The broach 288 passes through a ball joint 286 as shown in FIG. 6 and this ball joint 286 is rotatably mounted in one or two rings carried by the walls of the shells 220a, 220b.

In the case of FIG. 7d, each tab 294 of the shell 220a comprises a single wall that is perpendicular to the axis Z and comprises a radial orifice for the mounting of the broach 288. Each tab 295 of the shell 220b comprises two walls 295a, 295b that are perpendicular to the axis Z and that each comprise a radial orifice for the mounting of the broach 288. The wall of the shell 220a is radially interposed between the walls 295a, 295b of the shell 220b.

In the case of FIG. 7d, the broach 288 is also carried by the finger 282 and passes through a ball joint 286 as shown in FIG. 6. This ball joint 286 is rotatably mounted in one or two rings carried by the walls of the shells 220a, 220b.

FIGS. 8 and 9 show another alternative embodiment of a connection between the cage carrier 222 and the cage 220 of the planet carrier 213.

Unlike the embodiment of FIG. 6 in which the walls of the tabs 294, 295 are radially supported one over each other and nested with a tightened adjustment within each other, the walls of the tabs 294, 295 of the shells 220a, 220b are here configured to avoid any interference and any contact between them, and thus any risk of fretting.

To accomplish this, the broach 288 may be staged as shown in FIG. 9 and comprise a succession of axial sections of different diameters distributed from largest to smallest from the collar 88b of this broach. The broach 288 thus defines a succession of cylindrical bearing surfaces that are supported radially on the walls 294a, 294b, 295a, 295b and the ball joint 286 in order to maintain the walls at a radial distance from each other.

The tabs 294a, 295 and the walls 294a, 294b, 295a, 295b of the shells 220a, 220b have a similar configuration to those in FIGS. 6 and 8. The collar 288b of the broach 288 is radially supported on an upper face of the wall 295a of the shell 220b. The broach 288 comprises a first section 288c that passes through the orifice 220b1 of this wall 295a and a first cylindrical shoulder 288c1 that is supported on an upper face of the wall 294a of the shell 220a. The broach 288 comprises a second section 288d of smaller diameter that passes through the orifice 22a1 of this wall 294a and a second cylindrical shoulder 288d1 that is supported with this wall 294a on the ball joint 286. The broach 288 comprises a third, smaller diameter section 288e that passes through the orifice of this ball joint 286 that is supported with a third cylindrical shoulder 288e1 on an upper face of the wall 294b of the shell 220b. The broach 288 comprises a fourth section 288f of smaller diameter that passes through the orifice 220a2 of this wall 294b and a fourth cylindrical shoulder 288f1 that is supported on an upper face of the wall 295b of the shell 220b. The broach 288 comprises a fifth, of smaller diameter section 288g that is housed in the orifice 220b2 of the wall 295b.

As illustrated in FIGS. 8 and 9, the walls 295aa, 295b of the shell 220b define between them the housing 280 for mounting the finger 282 which comprises a ring (not shown) for mounting the ball joint 286.

It is therefore directly the broach 288 which maintains the two shells 220a, 220b independently of each other. This means that it is not necessary to index the broach to maintain the two shells 220a, 220b in place radially. Nevertheless, to add a further security, it is possible to introduce an indexing on the broach or any other immobilization system allowing to guarantee no friction between the shells, as shown in the following figures.

FIGS. 10a to 10d show alternative embodiments for the connections between the cage carrier 222 and the cage 220 of the planet carrier 213.

The variant embodiment shown in FIG. 10a corresponds to the previous variant embodiment shown in FIGS. 8 and 9.

The embodiment of FIG. 10b differs from that of FIG. 10a in that the tabs 294, 295 of the shells 220a, 220b are axially supported each other. This axial support preferably takes place in a median plane Pi of the cage which is perpendicular to the axis X.

The alternative embodiment of FIG. 10c differs from that of FIG. 10b in that the tabs 294, 295 of the shells 220a, 220b are additionally axially attached to each other, for example by means of bolts 296 that pass through passages in the tabs 294, 295.

The alternative embodiment of FIG. 10d differs from that of FIG. 10b in that the tabs 294, 295 of the shells 220a, 220b are additionally axially and circumferentially nested within each other. To this end, the one of the shells 220a comprises circumferential lugs 297 intended to cooperate by interlocking with notches 298 with shape complementary of the other shell 220b. When assembling the cage 220, the shells 220a, 220b are aligned along the axis X and the tabs 294 of the shell 220a are axially offset from the tabs 295 of the shell 220b. The shells 220a, 220b are brought closer to each other until their tabs 294, 295 are substantially located in a same plane perpendicular to the axis X, such as the plane Pi of FIG. 10b, then the shells 220a, 220b are angularly displaced with respect to each other to make the interlocking of the lugs 297 in the notches 298.

For the assembly of the planet carrier 213, first the sun gear 11 and the planet gears 12 of the reducer 210 are mounted in one of the shells 220a, then the other shell 220b is positioned. The cage carrier 222 is then positioned with the ball joints 286 and finally the broaches 288 are mounted to maintain all the parts together.

The invention claimed is:

1. A planet carrier for a speed reducer of a turbomachine, this planet carrier having a main axis X and comprising:
    a cage carrier comprising an annular row of axial fingers about the axis X, which comprises first connection elements, and
    a cage comprising an internal cavity configured to contain a central sun gear of axis X of rotation and an annular row of planet gears arranged around the axis X and meshed with said sun gear as well as with a ring gear intended to surround the cage, the cage comprising at its periphery housings and second connection elements which are mounted in said housings and which cooperate with the first connection elements to form connections between the cage carrier and the cage, said connections having at least one degree of freedom,
    the cage comprising two shells which are axially assembled to each other, said first or second connection elements comprising broaches oriented radially with respect to said axis X and passing through radial orifices of said shells,
    wherein each of the shells comprises one or two orifices for mounting each of the broaches.

2. The planet carrier according to claim 1, wherein said second elements comprise said broaches and ball joints through which these broaches pass, and said first elements comprise rings in which said ball joints are housed.

3. The planet carrier according to claim 1, wherein said first elements comprise said broaches and ball joints through which these broaches pass, and said second elements comprise rings in which said ball joints are housed.

4. The planet carrier according to claim 1, wherein said orifices are formed in tabs of said shells, the tabs of each shell being evenly distributed about the axis X and being at least partly superimposed in radial direction with the tabs of the other shell.

5. The planet carrier according to claim 4, wherein each of the tabs of a first of the shells comprises two parallel first walls which respectively comprise two aligned radial orifices for mounting one of the broaches, and/or each of the tabs of a second of the shells comprises two parallel second walls which respectively comprise two aligned radial orifices for mounting this same broach.

6. The planet carrier of claim 5, wherein the first walls are located between the second walls, or one of the first walls is interposed between the two second walls.

7. The planet carrier according to claim 5, wherein said fingers are interposed between the first walls and between the second walls.

8. The planet carrier according to claim 5, wherein said fingers are each generally C-shaped and comprise two parallel branches between which are interposed said first and second walls.

9. The planet carrier according to claim 1, wherein the shells are supported axially one against the other, and/or are axially attached to each other, and/or are axially and/or circumferentially nested within each other.

10. A mechanical reducer for an aircraft turbomachine, comprising a planet carrier according to claim 1, a sun gear mounted in said cavity and centred on said axis X, a ring gear extending around the sun gear, and planet gears mounted in said cavity and meshed with the sun gear and the ring gear.

11. A turbomachine, in particular for an aircraft, comprising a reducer according to claim 10.

12. The planet carrier of claim 5, wherein the first walls are located between the second walls and wherein each broach is staged and comprises a succession of axial sections of different diameters distributed from largest to smallest from a collar of this broach, said broach thus defining a succession of cylindrical bearing surfaces that are supported radially on the first and second walls and the ball joint in order to maintain the walls at a radial distance from each other.

13. A planet carrier for a speed reducer of a turbomachine, this planet carrier having a main axis X and comprising:
a cage carrier comprising an annular row of axial fingers about the axis X, which comprises first connection elements, and
a cage comprising an internal cavity configured to contain a central sun gear of axis X of rotation and an annular row of planet gears arranged around the axis X and meshed with said sun gear as well as with a ring gear intended to surround the cage, the cage comprising at its periphery housings and second connection elements which are mounted in said housings and which cooperate with the first connection elements to form connections between the cage carrier and the cage, said connections having at least one degree of freedom,
the cage comprising two shells which are axially assembled to each other, said first or second connection elements comprising broaches oriented radially with respect to said axis X and passing through radial orifices of said shells,
wherein each of the shells comprises one or two orifices for mounting each of the broaches,
wherein said orifices are formed in tabs of said shells, the tabs of each shell being evenly distributed about the axis X and being at least partly superimposed in radial direction with the tabs of the other shell.

* * * * *